United States Patent
Feng et al.

(10) Patent No.: US 8,294,807 B2
(45) Date of Patent: Oct. 23, 2012

(54) IMAGING SYSTEM WITH VARIABLE OPTO-MECHANICAL SYSTEM, ABERRATED OPTICS AND COMPENSATING FILTER BANK

(75) Inventors: Guotong Feng, Mountain View, CA (US); M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 511 days.

(21) Appl. No.: 12/359,214

(22) Filed: Jan. 23, 2009

(65) Prior Publication Data
US 2010/0188552 A1    Jul. 29, 2010

(51) Int. Cl.
*H04N 5/225* (2006.01)
(52) U.S. Cl. ........................ 348/340; 348/335
(58) Field of Classification Search .......... None
See application file for complete search history.

(56) References Cited

U.S. PATENT DOCUMENTS

| | | | |
|---|---|---|---|
| 6,411,976 B1 * | 6/2002 | Cesari et al. ................. 708/319 |
| 6,614,474 B1 * | 9/2003 | Malkin et al. ................. 348/252 |
| 7,215,493 B2 * | 5/2007 | Olmstead et al. ............. 359/793 |
| 7,260,251 B2 * | 8/2007 | Dowski et al. ................ 382/128 |
| 7,466,496 B2 * | 12/2008 | Hoshi ........................... 359/687 |
| 7,612,805 B2 * | 11/2009 | Solomon .................... 348/222.1 |
| 7,616,841 B2 | 11/2009 | Robinson et al. |
| 7,616,842 B2 | 11/2009 | Robinson |
| 7,710,469 B2 * | 5/2010 | Ueyama ..................... 348/240.2 |
| 8,014,660 B2 * | 9/2011 | Nomura ......................... 396/72 |
| 2007/0081224 A1 | 4/2007 | Robinson et al. |
| 2008/0284896 A1 | 11/2008 | Robinson et al. |
| 2009/0040330 A1 | 2/2009 | Robinson et al. |

* cited by examiner

*Primary Examiner* — Luong T Nguyen
(74) *Attorney, Agent, or Firm* — Fenwick & West LLP

(57) ABSTRACT

A weighted sum of a set of component filters is used to effectively apply different "composite" FIR filters to compensate for aberrations resulting from different opto-mechanical settings. The FIR filters are "composite" in the sense that they are a weighted sum of the set of component filters. In one approach, the aberrations vary as a function of the opto-mechanical setting, and the opto-mechanical setting is used to determine the weights of the different component filters.

18 Claims, 6 Drawing Sheets

IMAGING SYSTEM WITH VARIABLE OPTO-MECHANICAL SYSTEM, ABERRATED OPTICS AND COMPENSATING FILTER BANK

BACKGROUND OF THE INVENTION

1. Field of the Invention

This invention relates to aberrated imaging systems having a variable opto-mechanical component (for example, a variable aperture), in which a filter bank is used to compensate the aberrations introduced at different opto-mechanical settings.

2. Description of the Related Art

Electro-optic imaging systems typically include imaging optics (e.g., a lens or mirror assembly), an electronic sensor array (e.g., CCD detector array) and a digital image processor (e.g., typically implemented in dedicated chips or software). Traditional methods for designing these systems generally involve fairly independent steps. The optics typically is designed with the goal of forming a high quality intermediate optical image at the sensor array. The digital image processing typically is designed after the optics, with the goal of compensating for remaining defects in the sampled intermediate optical image.

The design stages typically occur with little coordination between the optical designer and the image processing designer. One drawback to the traditional design approach is that synergies between the optics and the digital image processing subsystem may be overlooked. The optical designer creates the "best" optical subsystem without knowledge of the digital image processing subsystem. The image processing designer creates the "best" digital image processing subsystem without the ability to modify the previously designed optical subsystem. These subsystems are then "glued" together.

There has been recent interest in taking advantage of these possible synergies. For example, U.S. patent application Ser. No. 11/155,870 "End-To-End Design of Electro-Optic Imaging Systems" to Robinson and Stork concerns a general approach to designing an imaging system by allowing the imaging optics and image processing to compensate each other. Thus, while neither the optics nor the image processing may be optimal when considered alone, the interaction of the two produces good results. Put in another way, in order to achieve a certain overall image quality, this approach allows the use of lower quality optics and/or lower quality image processing so long as the two compensate each other to achieve the desired performance.

However, the situation becomes more complicated when the imaging optics has a variable opto-mechanical component that can be set to different settings. Adjusting the opto-mechanical settings changes the aberrations introduced by the imaging optics. Variable aperture optical systems are one example of a variable opto-mechanical component. For well-corrected imaging optics, changing the aperture size (f-number) may not be much of an issue since a system that is well-corrected at an open aperture setting will still be well-corrected at a more closed aperture setting. However, in the synergistic approach, the imaging optics typically is not well-corrected. For example, the imaging optics might suffer from significant spherical aberration. Adjusting the aperture setting changes the amount of spherical aberration. This, in turn, will require different image processing to compensate for the different amount of aberration. Thus, the system at F/4 may require certain filters and the system opened up to F/2 may require different filters. Storing different filter coefficients for different F/#'s requires increasing the memory requirements and circuit complexity for the image processing subsystem.

Other examples of variable opto-mechanical systems include zoom systems and image stabilization systems using mechanical lens tilt or decentration.

Thus, there is a need for approaches that allow different filters to be applied to compensate for different aberrations, but in a more efficient manner.

SUMMARY OF THE INVENTION

The present invention overcomes the limitations of the prior art by using a weighted sum of a set of component filters. By changing the weights, the effective "composite" FIR (finite impulse response) filter can be changed to fit different aberration situations. The FIR filters are "composite" in the sense that they are a weighted sum of the set of component filters. In one approach, the aberrations vary as a function of the opto-mechanical setting, so the opto-mechanical setting is used to determine the weights of the different component filters.

In one aspect, a digital-optical imaging system includes imaging optics, a sensor array and an image processor. The imaging optics has an adjustable aperture setting. The imaging optics produces images that are captured by the sensor array. The image processor applies a composite FIR filter to the captured images. It does so by applying a weighted sum of a set of component filters to the captured images. The weights for the weighted sum vary depending on the adjustable aperture setting of the imaging optics. In contrast, the filter coefficients for the component filters do not depend on the adjustable aperture setting. Thus, the composite FIR filter can be changed by varying the weights of the different component filters as a function of the adjustable aperture setting. In one approach, the set of component filters is a set of nested component filters. Other aspects of the invention include components, systems and methods related to those described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
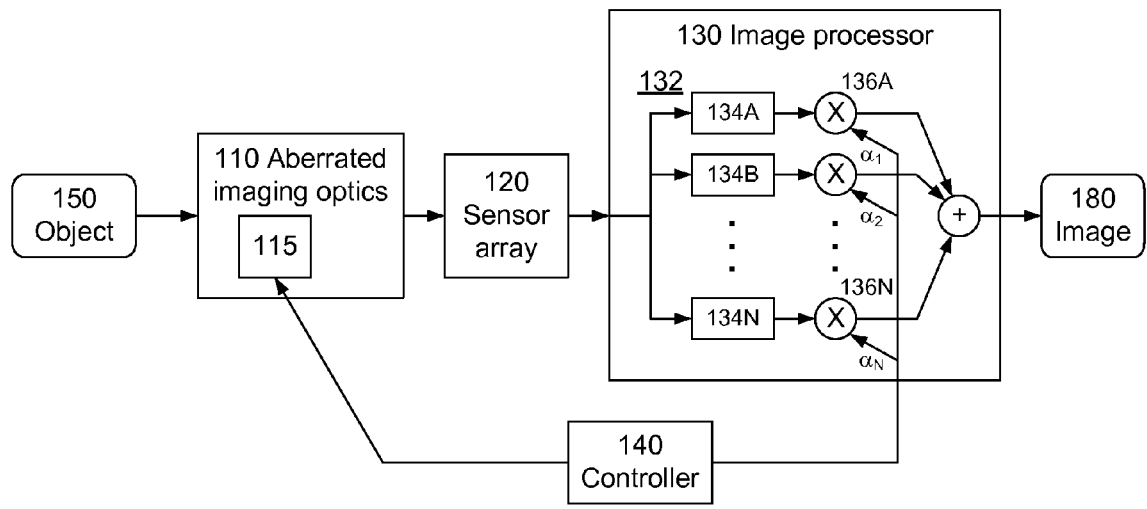
FIG. 1 is a block diagram of a digital-optical imaging system according to the invention.

FIG. 1 is a block diagram of a digital-optical imaging system according to the invention. The imaging system includes aberrated imaging optics 110 (e.g., a lens assembly), sensor array 120 (e.g., CCD detector array) and image processor 130 (e.g., typically implemented in dedicated chips or software). The imaging system produces a digital image 180 of an object 150. It is a "digital-optical" imaging system in the sense that optics 110 are used to produce an image on the sensor array 120, and the captured image is digitally processed by the image processor 130.

The imaging optics 110 has a variable opto-mechanical component 115. For example, the system may have a variable aperture which adjusts to different F/#'s. Irises and other devices can be used to stop down and open up the aperture size. As a result, the imaging optics will introduce different amounts of aberration depending on the aperture setting. For example, a larger aperture (faster F/#) typically will introduce a larger amount of aberration (i.e., larger spot size) compared to the same imaging optics used at a smaller aperture setting (slower F/#).

Variable aperture (i.e., variable F/#) will be used in much of the following discussions, although it should be understood that the invention is not limited to this particular variable component. The image processor 130 applies an FIR filter to the captured image to compensate for the aberrations introduced by imaging optics 110. Because the aberrations will vary as a function of F/#, the FIR filter applied will also vary as a function of F/#. In other words, different FIR filters are applied for different aperture settings. In the example of FIG. 1, this is achieved by using a filter bank 132 that includes component filters 134A-N. A weighted sum of the component filters 134 is applied to the captured image. In FIG. 1, this is implemented by multipliers 136A-N, which apply weights $\alpha_1$-$\alpha_n$ to the filtered results. The invention is not limited to this particular implementation. The net effect of the weighted sum of component filters 134 is a "composite" FIR filter that is a function of the weights $a_n$. Different composite FIR filters can be generated by changing the weights $\alpha_n$, which is done as a function of the aperture setting. In FIG. 1, controller 140 both sets the size of aperture 115 and also sets the corresponding weights $\alpha_n$ for a given aperture setting.

Figure 2:
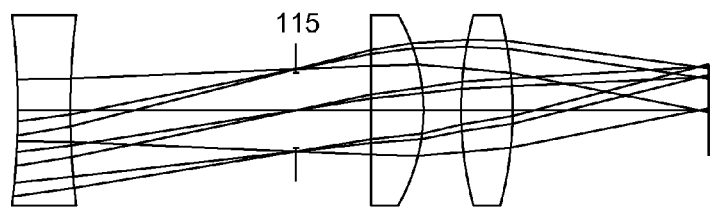
FIG. 2 is a diagram of a three lens system that has significant spherical aberration and a variable aperture, suitable for use with the invention.
Figure 3:
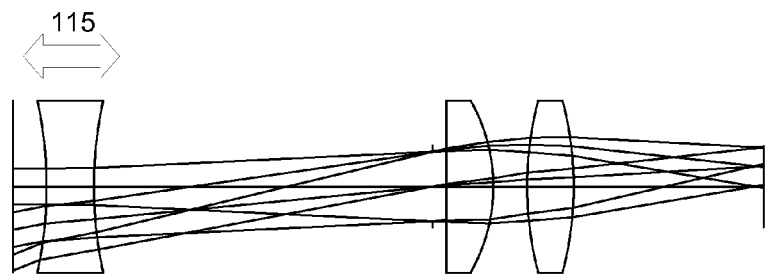
FIG. 3 is a diagram of a zoom lens system suitable for use with the invention.
Figure 4:
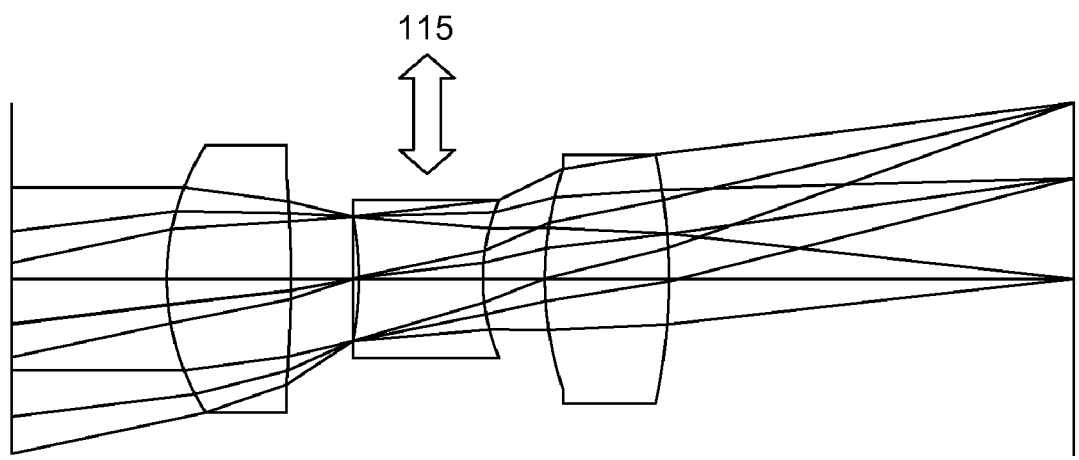
FIG. 4 is a diagram of a decentered lens system suitable for use with the invention.

FIGS. 2-4 are examples of imaging optics that may benefit from this approach. FIG. 2 is a specific example of a three lens system where the dominant aberration is third order spherical aberration. When third order spherical aberration is dominant, it normally will introduce more waves of aberration in the imaging optics than any other Seidel aberration. Table 1 lists the optical prescription of this system.

TABLE 1

Optical prescription for triplet of FIG. 2

| Surface | Type | Curvature | Thickness | Glass | Semi-Diameter |
|---|---|---|---|---|---|
| 0 | STANDARD | 0.00E+00 | 3.00E+03 | | 8.64E+02 |
| 1 | STANDARD | −1.92E−02 | 3.50E+00 | BK7 | 6.35E+00 |

TABLE 1-continued

Optical prescription for triplet of FIG. 2

| Surface | Type | Curvature | Thickness | Glass | Semi-Diameter |
|---|---|---|---|---|---|
| 2 | STANDARD | 1.92E−02 | 1.50E+01 | | 6.35E+00 |
| 3 | STANDARD | 0.00E+00 | 5.00E+00 | | 2.50E+00 |
| 4 | STANDARD | 0.00E+00 | 3.47E+00 | BK7 | 6.35E+00 |
| 5 | STANDARD | −7.77E−02 | 2.50E+00 | | 6.35E+00 |
| 6 | STANDARD | 3.98E−02 | 3.43E+00 | BK7 | 6.35E+00 |
| 7 | STANDARD | −3.98E−02 | 1.30E+01 | | 6.35E+00 |
| 8 | STANDARD | 0.00E+00 | 0.00E+00 | | 3.00E+00 |

This triplet system is operated at a wavelength of 540 nm, a field of view of 32 degrees full field and a focal length of 10.7 mm.

Spherical aberration (SA) is an image imperfection caused by the lens surface shape where the focus of incoming rays varies with the aperture. The effect of SA appears as blurs and low contrast in the captured image. One common characteristic of imaging optics that suffer from significant SA is the lower MTF values at low spatial frequencies. This corresponds to significant blurriness in the captured images, which is subsequently corrected with digital image processing. In this example, the opto-mechanical component is a variable aperture 115. The amount of spherical aberration varies with the aperture stop. Smaller apertures suffer from less spherical aberration. The filters 134A-N and corresponding weights $\alpha_1$-$\alpha_n$ can be designed to treat the different amounts of spherical aberration.

FIG. 3 is a diagram of a zoom lens system. In this example, the variable opto-mechanical component is a zoom lens 115. In zoom systems, the aperture size may remain fixed, but the focal length of the system changes thereby inducing a change in the F/# of the optical system. The filters 134A-N and corresponding weights $\alpha_1$-$\alpha_n$ can be designed for the different zoom settings. This specific example is a triplet optical system having moveable first optical element (reflected in the variable thickness of surface 3), which enables the focal length to change from 8 mm to 16 mm with a corresponding change to the back focal length (thickness of surface 8). This zoom, in turn, changes the effective F/# from F/2.5 to F/2.9, effectively changing the amount of spherical aberration contained in the optical image. Table 2 gives the optical prescription for the zoom triplet.

TABLE 2

Optical prescription for zoom triplet of FIG. 3

| Surface | Type | Curvature | Thickness | Glass | Semi-Diameter |
|---|---|---|---|---|---|
| 0 | STANDARD | 0.00E+00 | 1.70E+03 | | 2.97E+02 |
| 1 | STANDARD | 0.00E+00 | 2.50E+00 | | 6.35E+00 |
| 2 | STANDARD | −3.33E−02 | 3.50E+00 | BK7 | 6.35E+00 |
| 3 | STANDARD | 3.33E−02 | variable | | 6.35E+00 |
| 4 | STANDARD | 0.00E+00 | 1.00E+00 | | 3.07E+00 |
| 5 | STANDARD | 0.00E+00 | 3.47E+00 | BK7 | 6.35E+00 |
| 6 | STANDARD | −7.77E−02 | 2.50E+00 | | 6.35E+00 |
| 7 | STANDARD | 3.98E−02 | 3.43E+00 | BK7 | 6.35E+00 |
| 8 | STANDARD | −3.98E−02 | variable | | 6.35E+00 |
| 9 | STANDARD | 0.00E+00 | 0.00E+00 | | 3.00E+00 |

This zoom triplet system is operated at a wavelength of 540 nm.

FIG. 4 is a diagram of yet another example. In this example, the variable opto-mechanical component includes optical image stabilization optics. In such systems, an individual lens or lens group is often tilted or decentered to induce a spatial shift of the optical image at the detector. This shift is controlled to minimize image shake. In some optical systems, the opto-mechanical tilt or decentration changes the optical aberrations of the lens system. For example, lens decentration can introduce significant coma aberration into the optical system.

In the triplet optical system of FIG. 4, the center lens element can be decentered in the two dimensional plane perpendicular to the optical axis. Decentering the lens in this fashion induces a spatial shift in the optical image. Decentering the lens in this fashion can optically stabilize hand shake or other global motion of the imaging system, thereby eliminating motion blur of the captured image. Decentering the lens, however, introduces coma aberration into the optical image. The coma aberration creates a point spread function which is not rotationally symmetric and whose orientation is dependent on the lens decentration position. The image processing used to correct such coma aberration preferably applies a correspondingly non-symmetric sharpening to the captured image. Table 3 gives the optical prescription for this example.

TABLE 3

Optical prescription for decentered triplet of FIG. 4

| Surface | Type | Curvature | Thickness | Glass | Semi-Diameter |
|---|---|---|---|---|---|
| 0 | STANDARD | 0.00E+00 | 1.00E+10 | | 0.00E+00 |
| 1 | STANDARD | 0.00E+00 | 2.50E+00 | | 2.82E+00 |
| 2 | STANDARD | 2.50E−01 | 2.00E+00 | BK7 | 2.16E+00 |
| 3 | STANDARD | −4.68E−02 | 1.00E+00 | | 1.70E+00 |
| 4 | STANDARD | 0.00E+00 | 1.00E−01 | | 1.00E+00 |
| 6 | STANDARD | −1.88E−01 | 2.00E+00 | BK7 | 1.01E+00 |
| 7 | STANDARD | 3.11E−01 | 1.00E+00 | | 1.28E+00 |
| 10 | STANDARD | 1.80E−01 | 2.00E+00 | BK7 | 1.77E+00 |
| 11 | STANDARD | −1.06E−01 | 6.53E+00 | | 2.01E+00 |
| 12 | STANDARD | 0.00E+00 | 0.00E+00 | | 2.84E+00 |

This decentered triplet system is operated at a wavelength of 540 nm, F/4.5 and focal length of 13.3 mm.

Figure 5:
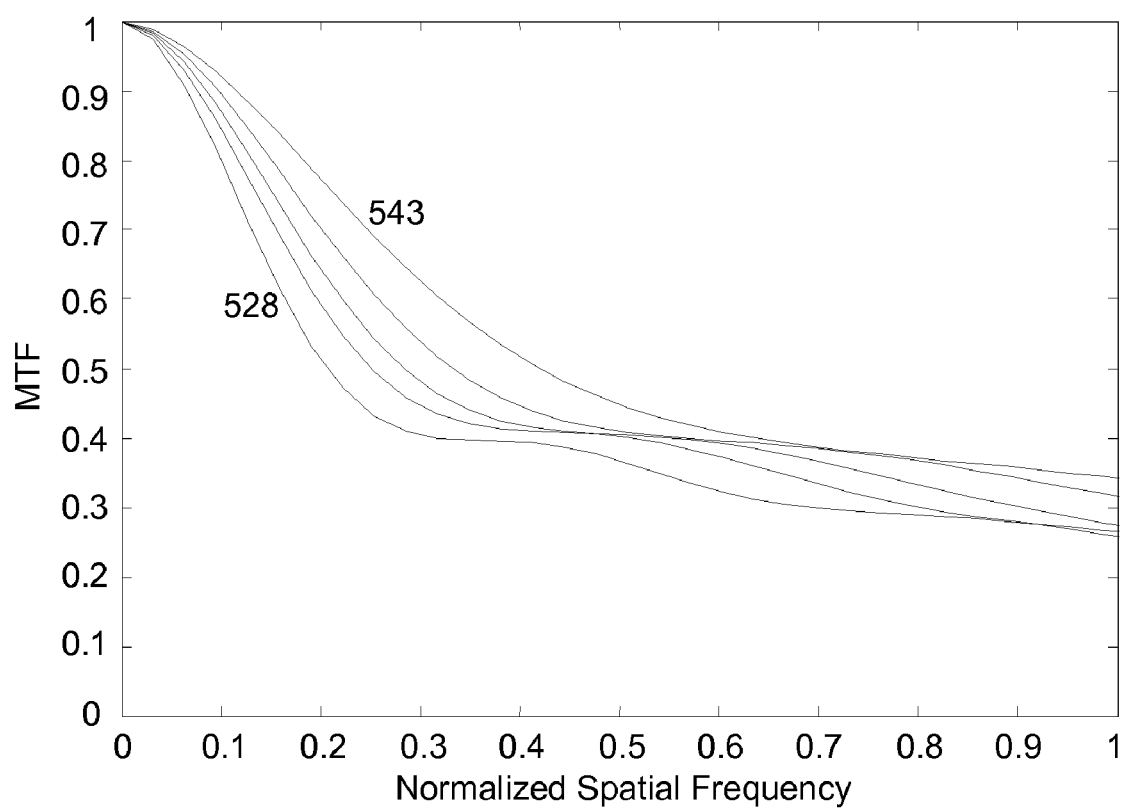
FIG. 5 is a diagram of MTFs for an example imaging optics at different aperture settings.

FIGS. 5-8 illustrate an example based on spherical aberration, in greater detail. The strength of spherical aberration, and hence the blurriness, increases with the square of the aperture or according to the inverse square of the F/#. FIG. 5 shows an example of five MTF curves for a variable-aperture imaging optics system. MTF curve 543 corresponds to the imaging optics operating at F/4.3 and MTF curve 528 corresponds to the imaging optics operating at F/2.8. The other three curves correspond to F/3.7, F/3.3 and F/3.0, respectively. Notice the drop at the low spatial frequencies corresponding to the increase in spherical aberration from F/4.3 to F/2.8.

This blur is characterized by the optical transfer function $H_i(\omega_1,\omega_2)$ for the imaging optics at a particular aperture setting i, where $\omega$ are the spatial frequencies. The digital image $v_i(m,n)$ produced by the entire imaging system for a particular aperture setting i can be approximated by $$v_i(m, n) = \sum_{k=-\infty}^{\infty} \sum_{l=-\infty}^{\infty} h(m-k, n-l)u(k, l) + \eta(m, n) \quad (1)$$

where u( ) is the ideal, unblurred image, and η( ) is the random noise associated with the imaging system. Restoration of the image can be based on application of a sharpening filter $R_i(\omega_1,\omega_2)$ $$\hat{U}(\omega_1,\omega_2) = R_i(\omega_1,\omega_2)V_i(\omega_1,\omega_2) \quad (2)$$

where $R_i(\omega_1,\omega_2)$ is the filter frequency response for setting i, and $V_i(\omega_1,\omega_2)$ is the Fourier transform of $v_i$. However, since the MTF of the optics changes so dramatically with aperture size, a single digital filter typically will not adequately correct the image artifacts for a set of aperture settings i.

One approach to address the image processing requirements for a variable-aperture system would be for the digital image processing subsystem to store multiple FIR filters, one for each possible aperture setting. However, this approach incurs significant cost by requiring either storage of multiple FIR filter taps or the use of complex circuitry.

A more efficient implementation of the digital sharpening for a variable-aperture imaging system relies on a filter bank that has component filters $R_\alpha(\omega_1,\omega_2)$. The effective filter response (i.e., composite filter response) for a particular aperture state i is a weighted sum of the component filters:

$$R_i(\omega_1, \omega_2) = \sum_{a} \alpha_a R_a(\omega_1, \omega_2) \quad (3)$$

As described below, in one implementation, the different component filters correspond to different filter tap regions, preferably non-overlapping regions. For example, one component filter might correspond to a center filter tap region, a second component filter to an annular filter tap region around the center filter tap region, a third component filter to an annular filter tap region around the first two filter tap regions, and so on. In an alternate approach, the filter tap regions may vary in angular segments in an overlapping or non-overlapping geometry.

This filter bank approach enables a more memory efficient and less computationally complex approach to correct a range of optical artifacts. Instead of storing the taps of multiple full-size FIR filters, the image processor need only store the fixed coefficients of the various component filters (each of which can span less than the full-size filter tap region in some implementations) and the collection of weights $\alpha_\alpha$ for different aperture settings. In addition, if the weight $\alpha_\alpha$ for a component filter is zero, the component filter need not be applied. This enables power-efficient processing, as the corresponding portions of the image processing circuit can be turned off and the system may run at a slower system clock speed. Image processing circuitry which enables variable filter tap coefficients is more complex than circuitry for fixed coefficients. For example, in the case of field-programmable gate array (FPGA) systems, distributed arithmetic (DA) filter architectures are efficient but required fixed filter tap coefficients. Using a filter bank approach enables efficient filter kernel implementation.

Figure 6:
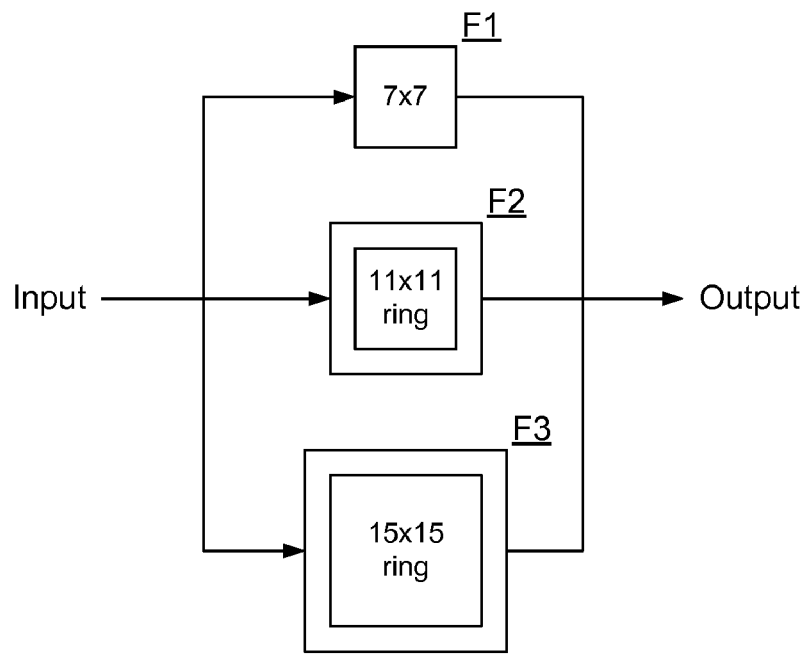
FIG. 6 is a diagram that shows nested component filters.

In one class of implementations, the component filters are nested. FIG. 6 is a diagram that shows nested component filters F1, F2 and F3. The 7×7 square labeled F1 is the filter tap region where component filter F1 has non-zero coefficients. The square annulus region F2 is the filter tap region where component filter F2 has non-zero coefficients. This region is 11×11 along its outer boundary and 7×7 along its inner boundary. Similarly, the square annulus region F3 is the filter tap region where component filter F3 has non-zero coefficients, which is 15×15 along its outer boundary and 11×11 along its inner boundary. Thus, a 7×7 composite filter can be realized by using only F1, an 11×11 composite filter by using F1 and F2, and a 15×15 composite filter by using F1, F2 and F3.

Nested component filters have an advantage for hardware implementations. When the weighting coefficient $\alpha_\alpha$ associated with the outermost ring(s) is zero, the system can reduce the power consumption by only turning on the component filters with non-zero weights. For example, in FIG. 6, a 7×7 composite filter can be realized by setting a non-zero weight for component filter F1 and zeroing the weights for component filters F2 and F3. Similarly, an 11×11 composite filter can be realized by setting non-zero weights for component filters F1 and F2 and zeroing the weights for component filter F3.

The nested set of component filters is particularly useful for spherical aberration because spherical aberration exhibits a corresponding behavior. At slow F/#'s, spherical aberration is low, producing a correspondingly narrow blur spot, which can be sharpened by a relatively small composite filter. As the F/# becomes faster, the spherical aberration increases, producing a wider blur spot, which is sharpened by a correspondingly larger composite filter (i.e., more components filters are turned on).

In one approach, the filter bank is designed by optimizing both the filter coefficients associated with the nested filter kernels $r_\alpha$ and the corresponding weights $\alpha_{\alpha i}$ over a set of aperture states $\{H_i(\omega_1,\omega_2)\}$. The minimization takes the form $$\min_{r_a,\alpha_{ai}} \sum_i E_{mtf}(H_i, R_i(\alpha_{ai}, r_a)) \quad (4)$$

where $E_{mtf}$ is the effective MTF error after digital filtering computed as $$E_{mtf}(H,R)=\int_0^1\int_0^1 |H(\omega_1,\omega_2)R(\omega_1,\omega_2)-T(\omega_1,\omega_2)|^2 P_s(\omega_1,\omega_2)d\omega_1 d\omega_2 \quad (5)$$

where $P_s(\omega_1,\omega_2)$ is a power spectral density weighting of the different spatial frequencies, and $T(\omega_1,\omega_2)$ is a target MTF function. In addition, certain weights $\alpha_{\alpha i}$ are constrained to be zero for certain aperture settings i, thus enforcing the nested nature of the component filters.

Figure 7A:
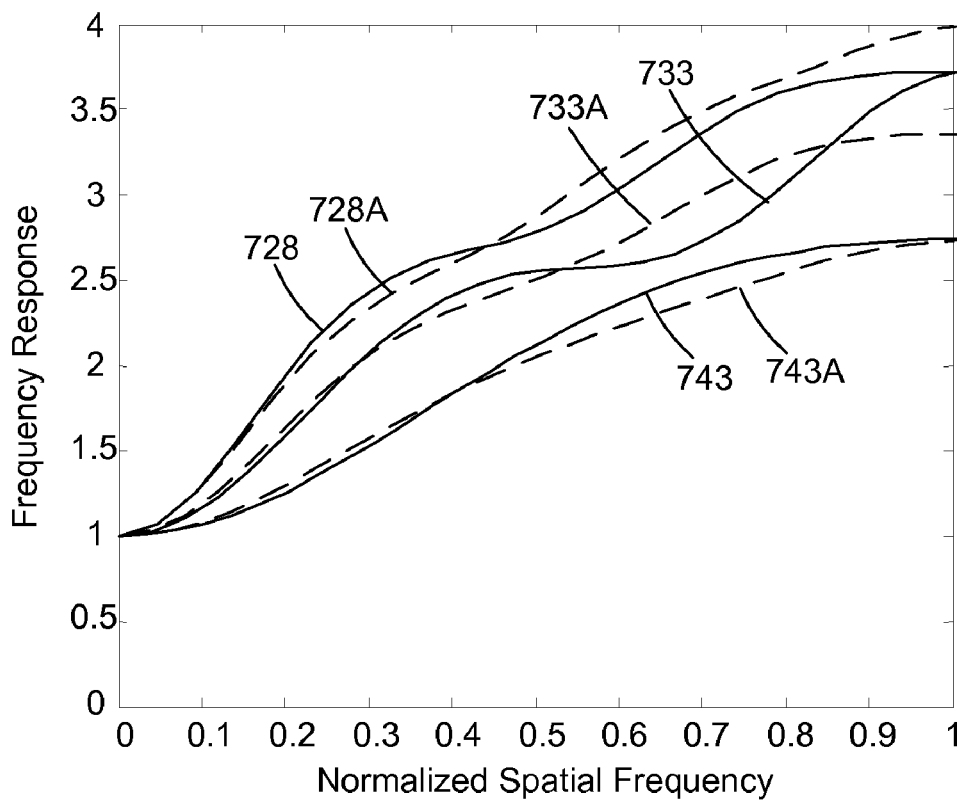
FIGS. 7A and 7B are diagrams of frequency responses and MTF errors showing the performance of a filter bank with nested component filters for correcting spherical aberration.
Figure 7B:
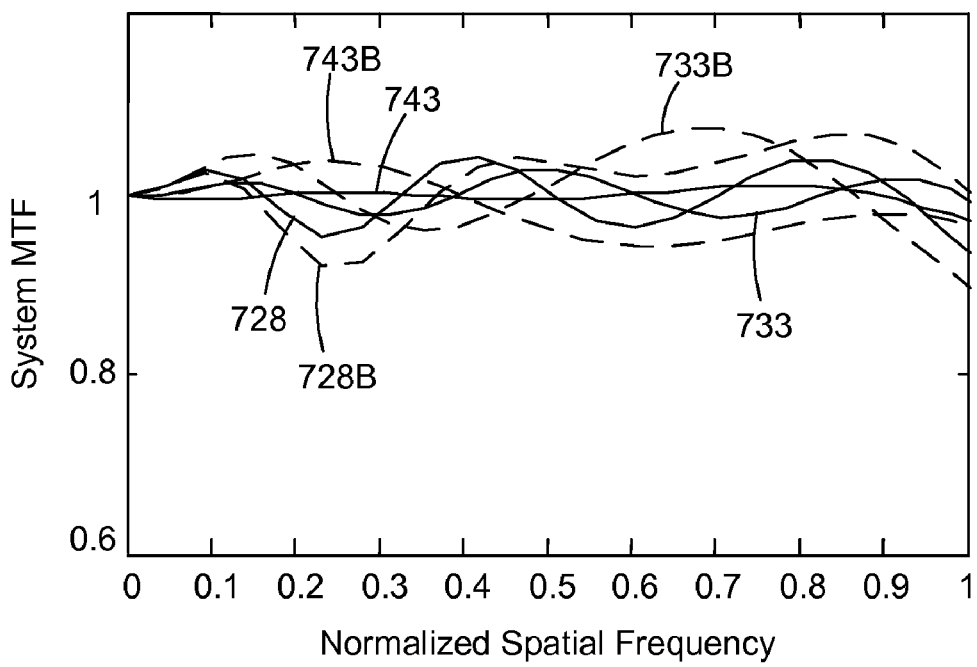

FIGS. 7A and 7B are diagrams showing the result of this optimization applied to an example based on simulation of a variable-aperture imaging optics system. In this example, the filter bank has a set of three component filters: a 7×7 square center filter, a 9×9 nested square annulus filter and an 11×11 nested square annulus filter. The filter coefficients for the three component filters are given in Table 4 below. These filters are symmetric about the origin so only one quadrant is shown in Table 4. The lower left element (3.021009 for Filter F1) is the origin.

TABLE 4

Filter coefficients for component filters F1, F2 and F3

Filter F1

| | | | |
|---|---|---|---|
| −0.03213 | −0.00446 | −0.00039 | 0.002289 |
| 0.028673 | −0.02891 | −0.01571 | −0.00014 |

TABLE 4-continued

Filter coefficients for component filters F1, F2 and F3

| | | | |
|---|---|---|---|
| −0.31798 | −0.04936 | −0.03108 | −0.0028 |
| 3.021009 | −0.31988 | 0.033507 | −0.03764 |

Filter F2

| | | | | |
|---|---|---|---|---|
| 0.002465 | −0.01485 | −0.03052 | −0.00947 | 0.013754 |
| | | | | −0.03039 |
| | | | | −0.02116 |
| | | | | −0.02298 |
| | | | | 0.01619 |

Filter F3

| | | | | | |
|---|---|---|---|---|---|
| −0.03614 | −0.0239 | −0.00294 | −0.00016 | 0.00118 | 0.013214 |
| | | | | | 0.000448 |
| | | | | | −0.00222 |
| | | | | | −0.0044 |
| | | | | | −0.03085 |
| | | | | | −0.00938 |

In this example, the weights for the three component filters are optimized for three F/#'s: F/4.3, F/3.3 and F/2.8. Table 5 shows the weights for each F/#. $\alpha_n$ is the weight for filter Fn above. Note that F/4.3 has the smallest aperture, suffers from the least amount of spherical aberration and therefore requires the smallest size composite filter using only filter F1. At the other extreme, F/2.8 suffers from the most spherical aberration and therefore requires the largest size composite filter using all three filters F1, F2 and F3.

TABLE 5

Weights at different F/#'s

| | $\alpha_1$ | $\alpha_2$ | $\alpha_3$ |
|---|---|---|---|
| F/2.8 | 3.230235 | 1.177118 | 1 |
| F/3.3 | 2.744191 | 1 | 0 |
| F/4.3 | 1 | 0 | 0 |

In FIG. 7A, solid curves 728, 733 and 743 show the frequency response of an ideal FIR filter optimized for F/2.8, F/3.3 and F/4.3, respectively. Dashed curves 728A, 733A and 743A show the frequency responses for the "composite" FIR filters for F/2.8, F/3.3 and F/4.3, respectively, constructed using the set of nested component filters described in Tables 4 and 5 above. When the aperture is set to F/4.3, the two outer component filters are turned off and only the 7×7 center filter F1 is applied. This provides considerable computational savings when in the F/4.3 aperture setting. At F/2.8, all three components filters are used. As shown in FIG. 7A, the composite filter responses 728A, 733A and 743A using the filter bank are nearly identical to those of the ideal filters 728, 733 and 743, but requiring significantly less computational resources.

FIG. 7B shows the overall "system MTF," which includes effects of both the imaging optics and the image processor. Solid curves 728, 733 and 743 show the system MTF for the ideal case (i.e., separately optimized filters) for F/2.8, F/3.3 and F/4.3, respectively. Dashed curves 728B, 733B and 743B show the system MTF using the filter bank approach (i.e., after filtering by the composite filter). The nested filter bank solution achieves nearly identical performance, but requires significantly less computational resources. The effective MTF error $E_{mtf}$ is approximately 0.0014. This example demonstrates the effectiveness of nested component filters for different aperture settings. The approach can be extended to more aperture settings as well as to other types of point spread functions.

Figure 8A:
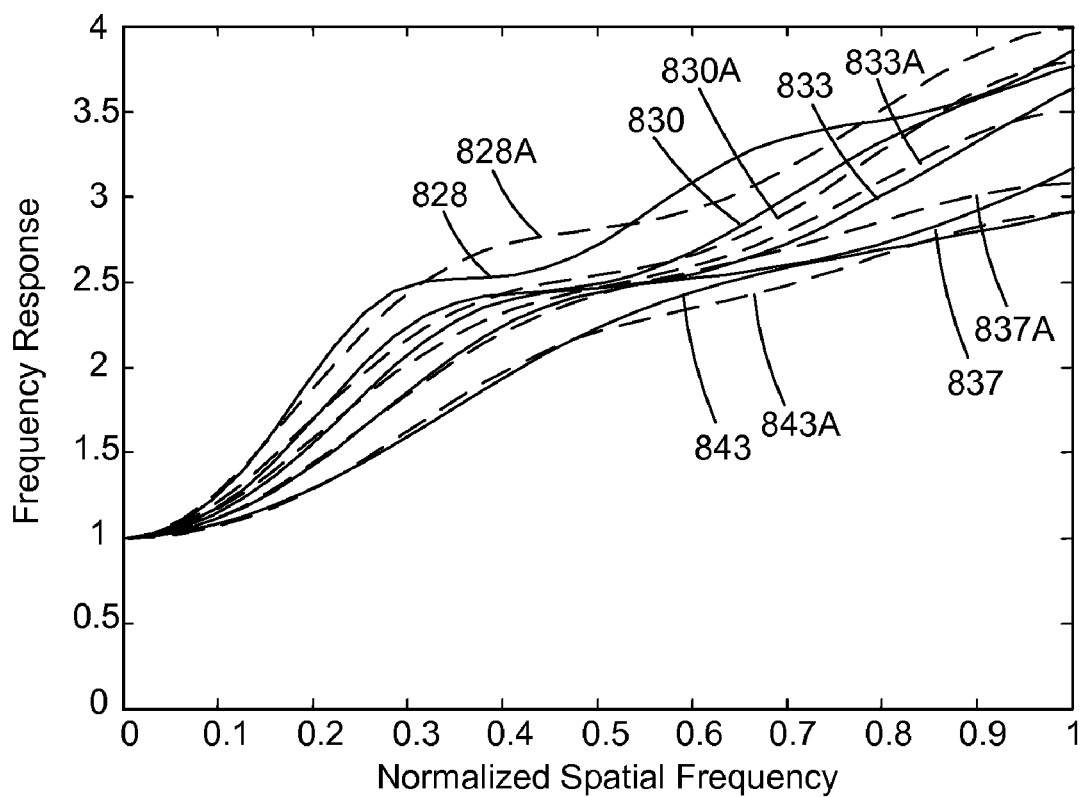
FIGS. 8A and 8B are diagrams of frequency responses and MTF errors showing the performance of a filter bank with non-nested component filters for correcting spherical aberration.
Figure 8B:
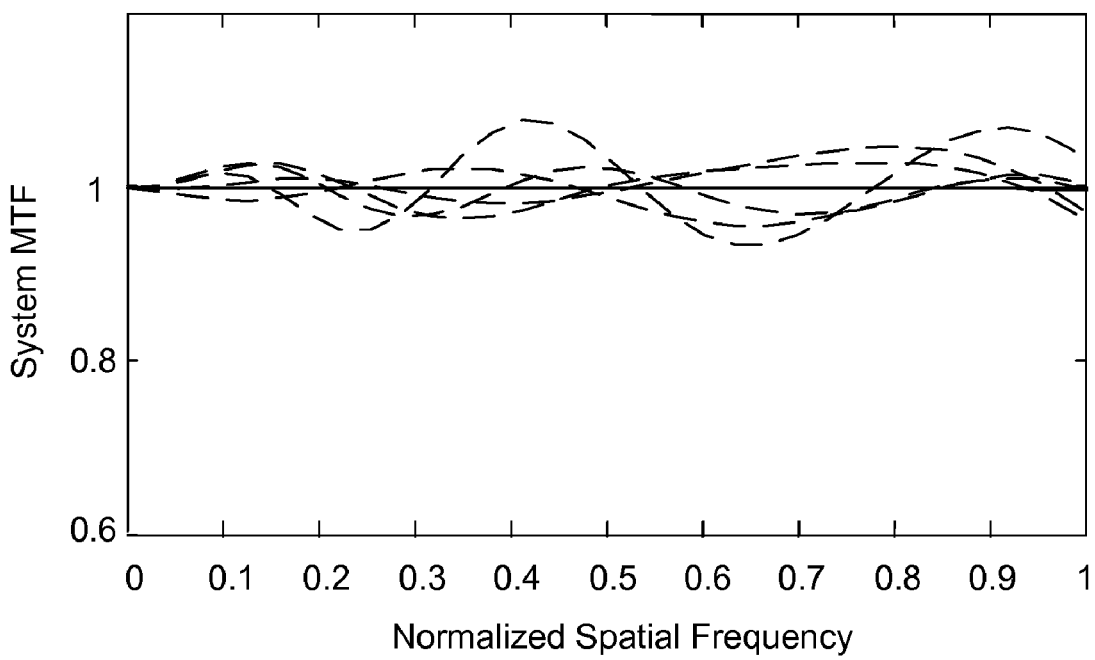

FIGS. 8A and 8B are diagrams showing the result of the above optimization applied to another example based on variable aperture imaging optics. In this example, the filter bank has a set of three component filters, but the component filters are not nested: a 7×7 square filter, a 9×9 square filter and an 11×11 square filter. The filters are optimized for five different F/# settings: F/2.8, F/3.0, F/3.3, F/3.7 and F/4.3. Table 6 shows the filter coefficients for the three component filters.

TABLE 6

Filter coefficients for component filters F1, F2 and F3

Filter F1

| | | | |
|---|---|---|---|
| 0.042351 | 0.006126 | −0.00781 | 0.001385 |
| −0.01799 | −0.16105 | −0.02724 | 0.002166 |
| 0.016449 | −0.04043 | −0.13645 | −0.00249 |
| 2.231862 | 0.072481 | 0.020711 | −0.04088 |

Filter F2

| | | | | |
|---|---|---|---|---|
| −0.00449 | −0.01922 | −0.00033 | 0.003611 | 0.00767 |
| −0.08082 | −0.03409 | −0.01704 | −0.03552 | 0.00397 |
| 0.061326 | 0.0069 | −0.02186 | −0.01835 | 0.000151 |
| −0.66831 | −0.08408 | −0.0106 | −0.02244 | −0.02803 |
| 5.589833 | −0.69077 | 0.060914 | −0.06381 | 0.004978 |

Filter F3

| | | | | | |
|---|---|---|---|---|---|
| 0.039015 | 0.009458 | 0.027134 | −0.00222 | 0.010303 | −0.04084 |
| −0.01089 | 0.013286 | 0.031482 | 0.023899 | 0.006428 | 5.88E−05 |
| −0.05969 | −0.05155 | 0.007087 | −0.0116 | 0.030837 | −0.00984 |
| −0.06322 | −0.08983 | 0.005948 | 0.013244 | 0.040863 | 0.013922 |
| −1.30691 | −0.14563 | −0.15404 | −0.04254 | −0.00786 | 0.044532 |
| 11.383 | −1.39257 | −0.03794 | 0.011234 | 0.000898 | 0.006255 |

Table 7 shows the weightings for the different aperture settings.

TABLE 7

Weights at different F/#'s

| | $\alpha_1$ | $\alpha_2$ | $\alpha_3$ |
|---|---|---|---|
| F/2.8 | 1 | 3.382202 | −0.52296 |
| F/3.0 | 1 | 6.222869 | −0.37809 |
| F/3.3 | 1 | 3.46057 | 0.080551 |
| F/3.7 | 1 | 1.091122 | 0.297742 |
| F/4.3 | 1 | 1 | 1 |

FIG. 8A shows the FIR filter response. Solid curves 828, 830, 833, 837 and 843 show the filter responses for the ideal case (i.e., separately optimized filters) for F/2.8, F/3.0, F/3.3, F/3.7 and F/4.3, respectively. Dashed curves 828A, 830A, 833A, 837A and 843A show the corresponding composite filter responses for the filter bank. FIG. 8B shows the overall "system MTF." Again, the solid curves are for the ideal case and the dashed curves are for the filter bank. The effective MTF error $E_{mtf}$ is less than 0.001.

Figure 9:
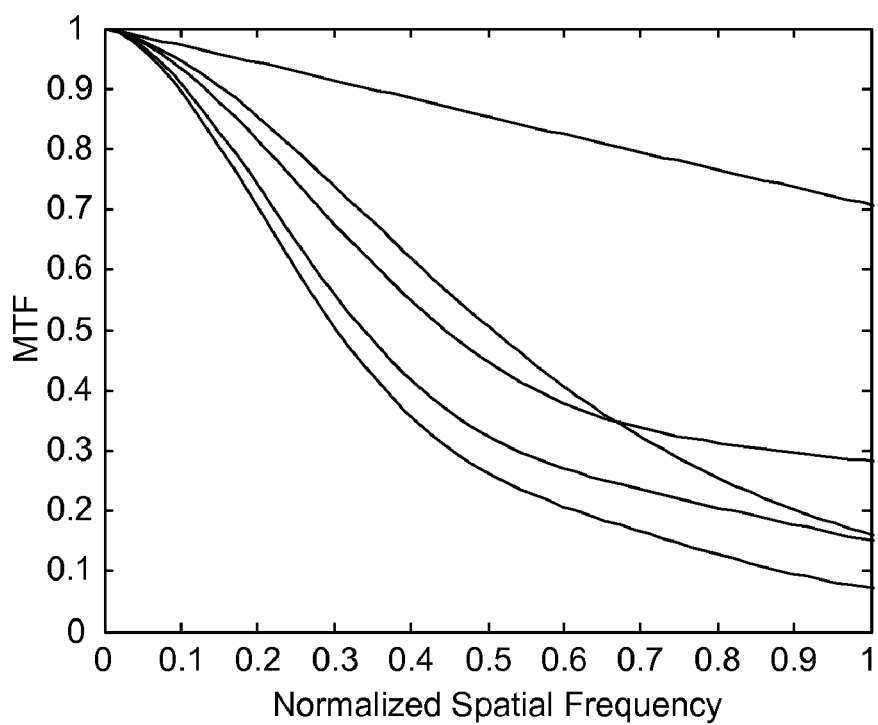
FIG. 9 is a diagram of MTFs for an example imaging optics at different amounts of decentering.

FIGS. 9-10 illustrate an example based on the decentered lens system shown in FIG. 4. In this example, the filter bank contains 9 component filters which are not nested. The filter kernels are optimized over 13 different decentering states. Some of the resulting component filters are shown in Table 8 below.

TABLE 8

Filter coefficients for component filters F1, F2 and F6

Filter F1

| | | | | | | |
|---|---|---|---|---|---|---|
| −0.1645724 | 0.0701219 | −0.2384323 | 0.54309344 | −0.2381958 | 0.0699092 | −0.1645868 |
| 0.06991101 | 0.60201625 | 0.06910688 | −0.9641000 | 0.06918907 | 0.6020159 | 0.0701277 |
| −0.2381836 | 0.06918543 | −0.962791 | 1.4237538 | −0.9627962 | 0.0691137 | −0.2384288 |
| 0.54310620 | −0.964097 | 1.42375942 | 10.7497287 | 1.42374959 | −0.964113 | 0.5431167 |
| −0.2384263 | 0.06912433 | −0.9627996 | 1.42374711 | −0.9627958 | 0.0691865 | −0.2381812 |
| 0.07012354 | 0.60202589 | 0.06917591 | −0.9641184 | 0.0691032 | 0.6020292 | 0.0699136 |
| −0.1645829 | 0.06991298 | −0.2382008 | 0.54310232 | −0.2384265 | 0.0701227 | −0.164596 |

Filter F2 (left half)

| | | | | | | |
|---|---|---|---|---|---|---|
| 0.00130195 | −0.0033917 | 0.00326707 | −0.0003894 | −0.0178710 | −0.026925 | −0.187404 |
| −0.0068814 | 0.01437251 | −0.0137337 | 0.00691979 | 0.03750924 | 0.0559044 | 0.5614417 |
| 0.01685117 | −0.0398518 | 0.04541541 | −0.0357006 | −0.0241704 | −0.0583917 | −1.0255337 |
| −0.0285010 | 0.06323556 | −0.0716256 | 0.0780956 | −0.0038842 | 0.0307072 | 1.6755705 |
| 0.05623687 | −0.129263 | 0.16179197 | −0.1569621 | −0.0071468 | 0.001392 | −2.8314709 |
| −0.0919275 | 0.18591398 | −0.1955193 | 0.17343453 | −0.0416436 | −0.1316934 | 6.3582625 |
| 0.04700203 | −0.1134823 | 0.17040638 | −0.3891610 | 0.75135958 | −2.3803327 | −0.1635441 |
| 0.06625458 | −0.1352866 | 0.18675456 | −0.1347454 | 0.10172909 | 0.1602216 | −2.275288 |
| −0.0464382 | 0.08827415 | −0.1336655 | 0.09861319 | −0.0320419 | −0.2518558 | 1.9718142 |
| 0.04058578 | −0.0810885 | 0.11523317 | −0.0653931 | 0.02968955 | 0.266334 | −1.4141776 |
| −0.0237186 | 0.04179213 | −0.0598218 | 0.01813899 | −0.0217279 | −0.1381046 | 1.0373513 |
| 0.01088424 | −0.0167586 | 0.02561254 | −0.0102059 | 0.02455401 | 0.0524004 | −0.6120785 |
| −0.0032223 | 0.00258646 | −0.0024404 | −0.0009111 | −0.0074776 | −0.0293133 | 0.2254363 |

Filter F2 (right half)

| | | | | | |
|---|---|---|---|---|---|
| 0.00928117 | −0.0309897 | 0.00832039 | −0.0009195 | −0.00204 | 0.001055 |
| −0.0164206 | 0.06738342 | −0.0153480 | −0.0021835 | 0.010238 | −0.00588 |
| 0.02259326 | −0.0667375 | −0.0057721 | 0.02801814 | −0.0325 | 0.014606 |
| −0.0401509 | 0.04968245 | 0.04393984 | −0.0497516 | 0.053094 | −0.02499 |
| −0.0158268 | −0.0037240 | −0.1745313 | 0.16912652 | −0.13205 | 0.055285 |
| 0.18980208 | −0.2344301 | 0.3196457 | −0.2778635 | 0.223382 | −0.09672 |
| −2.3994157 | 0.67653511 | −0.3477087 | 0.11982849 | −0.07314 | 0.024996 |
| 0.35117377 | −0.028384 | −0.0238992 | 0.12558857 | −0.10931 | 0.065206 |

TABLE 8-continued

Filter coefficients for component filters F1, F2 and F6

| | | | | | |
|---|---|---|---|---|---|
| −0.2064273 | −0.0521964 | 0.08736359 | −0.1279976 | 0.08516 | −0.04657 |
| 0.16034235 | 0.08941691 | −0.0989502 | 0.13567662 | −0.08964 | 0.043229 |
| −0.0361171 | −0.0658807 | 0.04666935 | −0.0761196 | 0.048636 | −0.02578 |
| −0.0313261 | 0.05407601 | −0.0309082 | 0.03661526 | −0.02101 | 0.011942 |
| 0.01062622 | −0.0197925 | 0.00693269 | −0.0063812 | 0.003957 | −0.00346 |

Filter F6 (left half)

| | | | | | | |
|---|---|---|---|---|---|---|
| −0.0024899 | 0.01536676 | −0.0424962 | 0.07938962 | −0.0901898 | 0.2421837 | −0.1869985 |
| 0.01538004 | −0.0568534 | 0.12553036 | −0.2145698 | 0.17738812 | −0.2961353 | 0.351769 |
| −0.0428120 | 0.12652674 | −0.2326098 | 0.34923479 | −0.2397945 | 0.0742101 | −0.4399457 |
| 0.08050104 | −0.2172743 | 0.35056158 | −0.4408712 | 0.24754492 | 0.4325636 | 0.2730652 |
| −0.0931458 | 0.18580325 | −0.253026 | 0.26832138 | −0.1495182 | −1.286045 | −0.4271857 |
| 0.25394409 | −0.3283727 | 0.12217292 | 0.36801366 | −1.2333121 | 4.3186538 | −0.4832458 |
| −0.1766534 | 0.32899119 | −0.4063502 | 0.23371893 | −0.3628445 | −0.5503115 | 0.835364 |
| −0.2732010 | 0.72120605 | −1.0430631 | 1.36965064 | −0.9116217 | −0.5479103 | −0.2291239 |
| 0.10022643 | −0.2538802 | 0.36932215 | −0.5102676 | −0.225322 | 1.613933 | 0.6883231 |
| −0.0483555 | 0.11180116 | −0.0903499 | 0.06117537 | 0.51091764 | −1.7521046 | −0.3462304 |
| 0.01826653 | −0.0426755 | 0.02314792 | 0.02719453 | −0.3492128 | 1.3060093 | 0.310196 |
| −0.0043138 | 0.00345075 | 0.01834319 | −0.0652200 | 0.2192398 | −0.8590178 | −0.2452158 |
| 0.00055148 | 0.00141064 | −0.009828 | 0.02661353 | −0.0758795 | 0.317673 | 0.1367154 |

Filter F6 (right half)

| | | | | | |
|---|---|---|---|---|---|
| −0.2635237 | 0.09691281 | −0.0453344 | 0.01657707 | −0.00382 | 0.000573 |
| 0.70927564 | −0.2468341 | 0.10308241 | −0.0374959 | 0.001135 | 0.001917 |
| −1.0394381 | 0.35964627 | −0.0757149 | 0.01352504 | 0.023532 | −0.01154 |
| 1.38323407 | −0.4989968 | 0.04154022 | 0.04183200 | −0.07394 | 0.029621 |
| −0.9580724 | −0.2303217 | 0.52215661 | −0.3589057 | 0.226284 | −0.07918 |
| −0.3884984 | 1.56754882 | −1.7384736 | 1.30978488 | −0.87099 | 0.327385 |
| −0.1633004 | 0.62430768 | −0.3070651 | 0.27664179 | −0.22242 | 0.126351 |
| −3.0520234 | 0.83210506 | −0.1419518 | −0.2116792 | 0.370913 | −0.26285 |
| 0.88487762 | 0.09078154 | −0.3621428 | 0.29193845 | −0.20776 | 0.100656 |
| −0.2064852 | −0.3413895 | 0.53623275 | −0.3776164 | 0.229546 | −0.08433 |
| −0.1636496 | 0.27866798 | −0.3763051 | 0.25403143 | −0.13952 | 0.046847 |
| 0.33864454 | −0.1992722 | 0.22680533 | −0.1384999 | 0.064547 | −0.01902 |
| −0.2510633 | 0.09766295 | −0.0832154 | 0.04651437 | −0.019000 | 0.004347 |

The other component filters are rotated versions of the above filters. Specifically, component filters F3, F4 and F5 are filter F2 rotated counterclockwise by 90, 180 and 270 degrees, respectively. Similarly, component filters F7, F8 and F9 are filter F6 rotated counterclockwise by 90, 180 and 270 degrees, respectively.

Table 9 shows the weightings for the different amounts of decentering (states 1-13).

TABLE 9

Weights at different decentering states

| State | $\alpha_1$ | $\alpha_2$ | $\alpha_3$ | $\alpha_4$ | $\alpha_5$ |
|---|---|---|---|---|---|
| 1 | 1 | 1 | 1 | 1 | 1 |
| 2 | 1 | 4.0783302 | −1.1910805 | −1.74331259 | −1.21041345 |
| 3 | 1 | 5.24050404 | 3.90603255 | 1.26572549 | 1.06130228 |
| 4 | 1 | 3.90505003 | 5.23172417 | 1.0628709 | 1.27791205 |
| 5 | 1 | −1.212052 | 4.07752831 | −1.19271359 | −1.7450164 |
| 6 | 1 | 1.0709234 | 5.2389869 | 3.90799938 | 1.27493629 |
| 7 | 1 | 1.28518714 | 3.90665092 | 5.2306056 | 1.07051517 |
| 8 | 1 | −1.7372204 | −1.2051514 | 4.07765751 | −1.18583697 |
| 9 | 1 | 1.28181661 | 1.07813877 | 5.23767783 | 3.90934225 |
| 10 | 1 | 1.07966201 | 1.29390671 | 3.90834545 | 5.22892912 |
| 11 | 1 | −1.1846802 | −1.7360193 | −1.20399015 | 4.07822271 |
| 12 | 1 | 3.9076073 | 1.27299934 | 1.06891666 | 5.23935075 |
| 13 | 1 | 5.230238 | 1.07250119 | 1.28709812 | 3.90703199 |

| State | $\alpha_6$ | $\alpha_7$ | $\alpha_8$ | $\alpha_9$ |
|---|---|---|---|---|
| 1 | 1 | 1 | 1 | 1 |
| 2 | 0.5365201 | −0.6082473 | −0.6926962 | 0.17156303 |
| 3 | 2.7247361 | −2.5593828 | 3.35322727 | −2.14665411 |
| 4 | 2.6258118 | −1.8789408 | 3.36031688 | −2.73492171 |
| 5 | 0.1714683 | 0.5364941 | −0.608457 | −0.69292037 |
| 6 | −2.1551643 | 2.7044191 | −2.5667635 | 3.33124324 |
| 7 | −2.7402891 | 2.6100524 | −1.8861507 | 3.34300629 |
| 8 | −0.6991738 | 0.1640621 | 0.52861601 | −0.61483245 |
| 9 | 3.3142045 | −2.161881 | 2.68866316 | −2.57260872 |
| 10 | 3.3212591 | −2.7473084 | 2.59021587 | −1.89543493 |
| 11 | −0.6146782 | −0.6990022 | 0.16414023 | 0.52864908 |
| 12 | −2.5651412 | 3.3359501 | −2.1533093 | 2.70877955 |
| 13 | −1.8881628 | 3.3383003 | −2.7418171 | 2.60575305 |

Figure 10A:
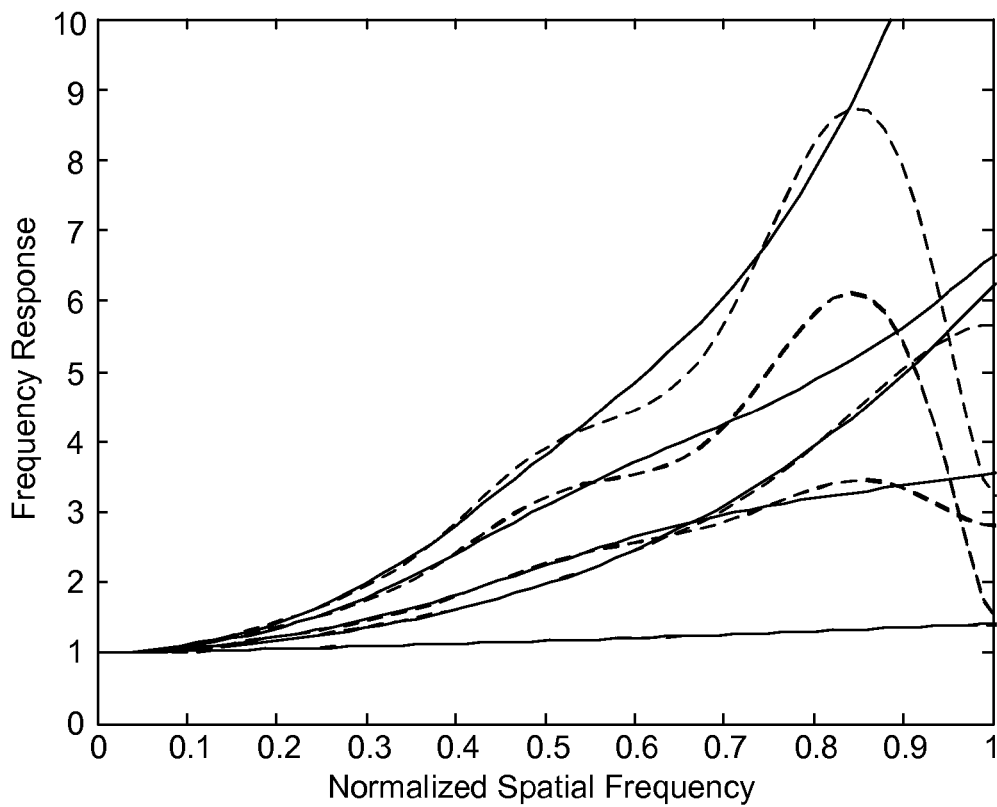
FIGS. 10A and 10B are diagrams of frequency responses and MTF errors showing the performance of a filter bank with non-nested component filters for correcting coma aberration.
Figure 10B:
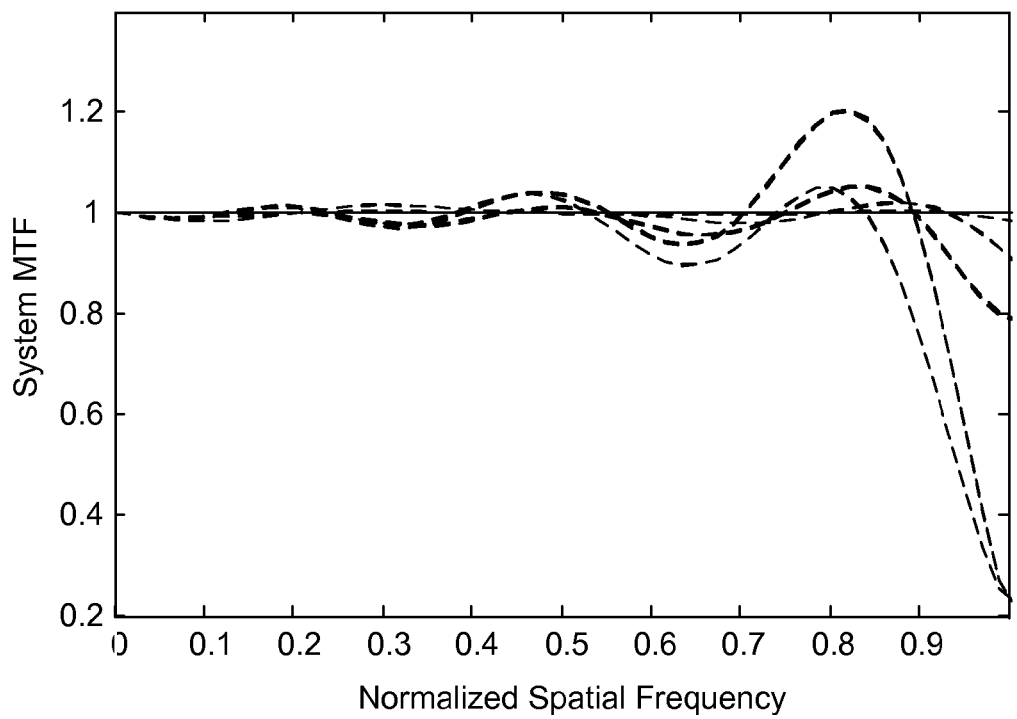

FIG. 9 shows an example of five MTF curves for different states of decentering. FIG. 10A shows the FIR filter response. The solid curves show the filter responses for the ideal case (i.e., separately optimized filters) for different amounts of decentering, and the dashed curves show the corresponding composite filter responses for the filter bank. FIG. 10B shows the overall "system MTF." Again, the solid curves are for the ideal case and the dashed curves are for the filter bank. The effective MTF error $E_{mtf}$ is less than 0.01.

Various aspects of the invention are especially beneficial for imaging systems used in consumer devices, for example a cell phone camera or digital camera. Many of these consumer applications operate primarily (or even exclusively) in the visible wavelength region, at F/#'s between approximately F/2 and F/6, and over fields of view up to about 60 degrees full field. The corresponding sensor arrays 120 often have pixel pitches (i.e., pixel to pixel spacing) of approximately 2 μm to 9 μm.

In one class of these digital-optical imaging systems, the imaging optics is characterized by between approximately 2 and 8 waves of third order spherical aberration $W_{040}$, and an undersampling factor U is in the range of approximately 0.05 to 0.30. The undersampling factor U, defined as $$U=\omega_N/\omega_{DL} \quad (6)$$

where $\omega_N$ is the Nyquist frequency of the sensor array (which depends on the pixel pitch) and $\omega_{DL}$ is the diffraction-limited frequency of the imaging optics (which depends on the operating wavelength and F/# of the imaging optics). Put in another way, undersampling factor U is proportional to the ratio of the diffraction-limited spot size to the pixel pitch. The system operates in the visible wavelength range.

For this class of systems, the FIR filter size can be set as follows. First, assume that the FIR filter is a square N×N filter. Then the filter size N preferably is between lower bound $N_0$ and preferred upper bound $N_1$. In practice, N can be either an odd or an even number. $N_0$ is a function of the spherical aberration $W_{040}$ and undersampling factor U:

$$N_0=\max\{3,X\} \quad (7)$$

$$X=a_1 U^2+a_2 W_{040}^2+a_3 U W_{040}+b_1 U+b_2 W_{040}+c \quad (8)$$

$$a_1=-172.4, a_2=-0.25, a_3=2.5, b_1=101.0, b_2=4.35 \text{ and } c=-18.2. \quad (9)$$

$N_1$ is also a function of $W_{040}$ and U:

$$N_1=2N_0+1 \quad (10)$$

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A digital-optical imaging system comprising:
   imaging optics having an adjustable opto-mechanical component;
   a sensor array positioned such that the imaging optics produces images on the sensor array; and
   an image processor coupled to the sensor array, the image processor applying a composite finite impulse response (FIR) filter to the images captured by the sensor array by applying a weighted sum of a set of component filters to the captured images, wherein weights for the weighted sum depend on the adjustable opto-mechanical setting of the imaging optics but filter coefficients for the set of component filters do not depend on the adjustable opto-mechanical setting.

2. The digital-optical imaging system of claim 1 wherein the set of component filters is a set of nested component filters.

3. The digital-optical imaging system of claim 2 wherein the set of nested component filters includes:
   a square center filter; and
   a plurality of nested square annulus filters.

4. The digital-optical imaging system of claim 2 wherein the set of nested component filters includes:
   a center filter; and
   a plurality of nested annulus filters.

5. The digital-optical imaging system of claim 1 wherein third order spherical aberration introduces more waves of aberration in the imaging optics than any other Seidel aberration.

6. The digital-optical imaging system of claim 1 wherein the image processor includes a filter bank containing the set of component filters, the set of component filters in the filter bank applied in parallel to the captured images.

7. The digital-optical imaging system of claim 6 further comprising power management circuitry that reduces power to a component filter when the weight for the component filter is zero.

8. The digital-optical imaging system of claim 1 wherein the imaging optics are rotationally symmetric.

9. The digital-optical imaging system of claim 8 wherein the imaging optics consist of spherical lenses.

10. The digital-optical imaging system of claim 1 wherein the imaging optics has an F/# of between approximately F/2 and F/6, wherein F/# is the F-number of the imaging optics.

11. The digital-optical imaging system of claim 1 wherein the digital-optical imaging system operates in a visible wavelength range.

12. The digital-optical imaging system of claim 1 wherein the digital-optical imaging system operates with a field of view of less than 60 degree full field.

13. The digital-optical imaging system of claim 1 wherein the sensor array has a pixel pitch of between approximately 2 µm and 9 µm.

14. The digital-optical imaging system of claim 1 wherein the adjustable opto-mechanical component is a zoom component.

15. The digital-optical imaging system of claim 1 wherein the adjustable opto-mechanical component is a decenterable optical component.

16. The digital-optical imaging system of claim 1 wherein the adjustable opto-mechanical component is a variable aperture.

17. The digital-optical imaging system of claim 16 wherein the number of component filters with non-zero weights increases monotonically as the imaging optics is set to a larger aperture.

18. The digital-optical imaging system of claim 1 wherein:
   the imaging optics are characterized by between approximately 2 and 8 waves of third order spherical aberration $W_{040}$;
   the sensor array is characterized by an undersampling factor U in the range of approximately 0.05 to 0.30 where U is the ratio of the Nyquist frequency of the sensor array divided by the diffraction-limited frequency of the imaging optics; and
   the weights for the weighted sum produce the composite FIR filter having at least $N_0$ rows and $N_0$ columns but not more than $N_1$ rows, where $$N_0=\max\{3,X\}$$

$$N_1=2N_0+1$$

$$X=a_1 U^2+a_2 W_{040}^2+a_3 U W_{040}+b_1 U+b_2 W_{040}+c$$

$a_1=-172.4, a_2=-0.25, a_3=2.5, b_1=101.0, b_2=4.35$ and $c=-18.2$.

* * * * *